Aug. 3, 1943.          W. E. DOUGHTY          2,326,018
DEVICE FOR STERILIZING GLASSES AND THE LIKE
Original Filed July 7, 1941     2 Sheets-Sheet 1

INVENTOR.
WILLIAM E. DOUGHTY
BY
ATTORNEYS

Aug. 3, 1943.  W. E. DOUGHTY  2,326,018
DEVICE FOR STERILIZING GLASSES AND THE LIKE
Original Filed July 7, 1941  2 Sheets-Sheet 2

INVENTOR.
WILLIAM E. DOUGHTY
BY
ATTORNEYS

Patented Aug. 3, 1943

2,326,018

UNITED STATES PATENT OFFICE 2,326,018

DEVICE FOR STERILIZING GLASSES AND THE LIKE

William E. Doughty, Detroit, Mich., assignor to James Vernor Company, Detroit, Mich., a corporation of Michigan Original application July 7, 1941, Serial No. 401,364. Divided and this application November 12, 1941, Serial No. 418,825

14 Claims. (Cl. 250—52)

This invention relates generally to apparatus for sterilizing various types of ware, particularly glassware such as drinking glasses and the like, and constitutes a division of my application filed July 7, 1941, bearing Serial No. 401,364.

One of the essential objects of the invention is to provide an apparatus of the type mentioned having a slideway extending through a transparent tunnel in which the drinking glasses may be subjected to rays from a germicidal lamp for sterilization purposes.

Another object is to provide an apparatus wherein the end portions of the slideway are disposed beyond opposite ends of the tunnel and constitute convenient loading and unloading stations respectively for the drinking glasses.

Another object is to provide an apparatus wherein the germicidal lamp has a support that functions as a reflector for the rays from said lamp.

Another object is to provide an apparatus that is a compact, self-contained unit, neat in appearance, and efficient in operation.

Other objects, advantages and novel details of construction of this invention will be made more apparent as this description proceeds, especially when considered in connection with the accompanying drawings, wherein.

Figure 1:
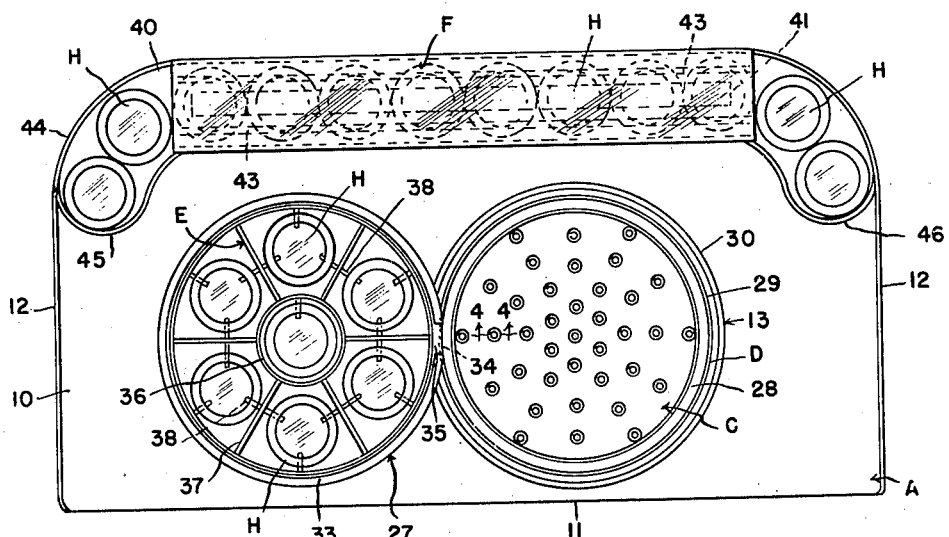
Figure 1 is a top plan view of an apparatus embodying my invention.
Figure 2:
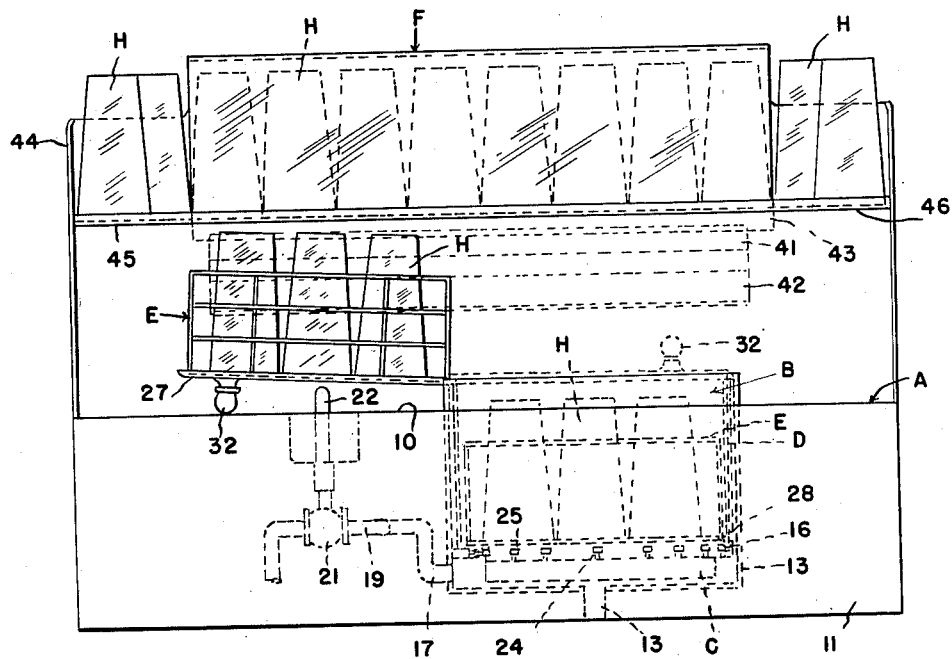
Figure 2 is a front elevation thereof showing by full lines the cover for the revoluble carrier in open inclined position and supporting the wire basket containing cleaned glasses, and showing by dotted lines the position of the cover and glasses during the washing operation.
Figure 3:
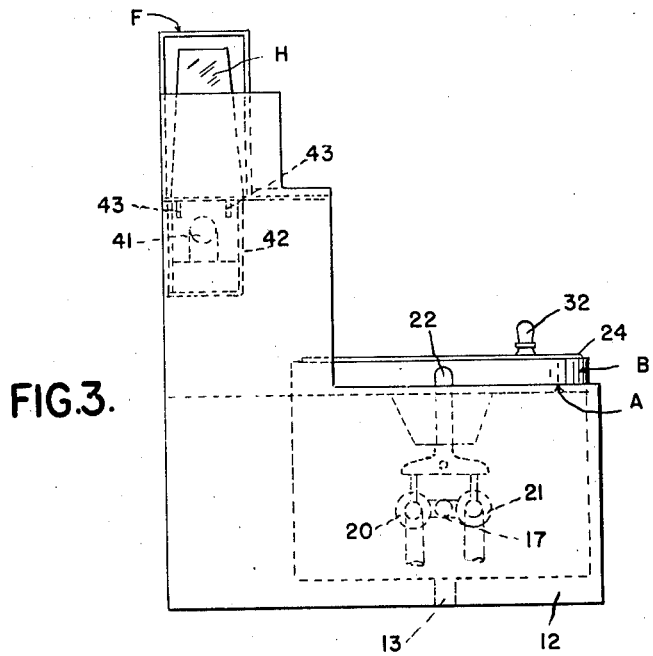
Figure 3 is an end elevation of the structure illustrated in Figure 2.
Figure 4:
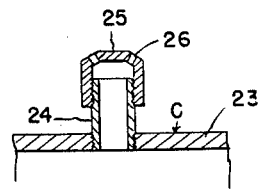
Figure 4 is a sectional view taken substantially on the line 4—4 of Figure 1.
Figure 5:
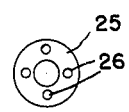
Figure 5 is a plan view of one of the nozzles.
Figure 7:
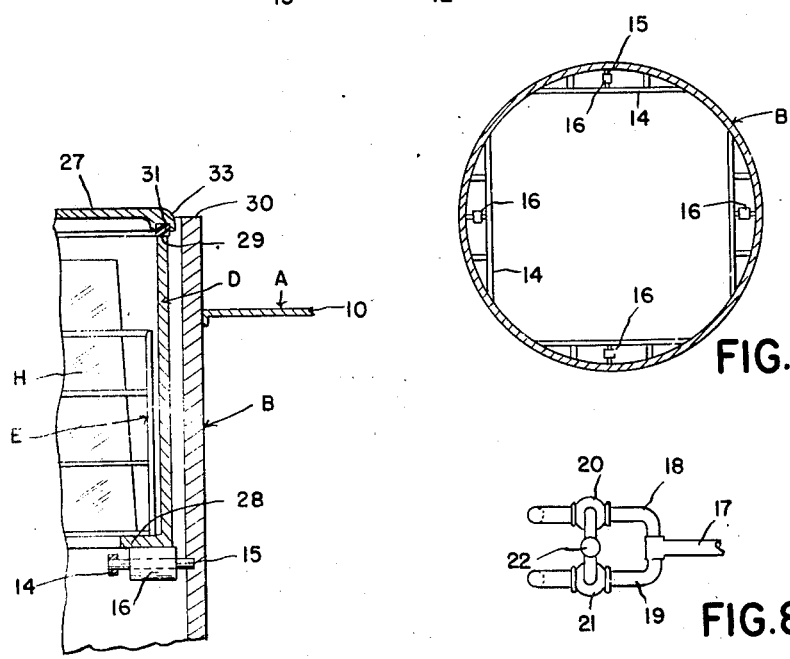
Figure 7 is a horizontal sectional view through the sink showing the mounting for the rollers.
Figure 6:
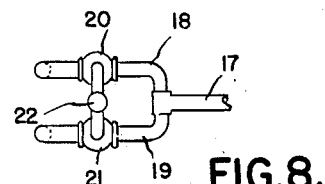
Figure 6 is a fragmentary vertical sectional view through the sink, carrier and wire basket.
Figure 8:
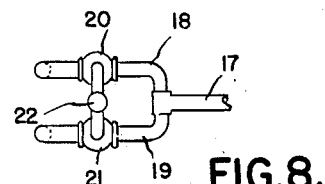
Figure 8 is a fragmentary plan view of the water conduits and valve control means therefor.

Referring now to the drawings, A is the counter, B is the sink, C is the header, D is the revoluble carrier, E is the wire basket, and F is the sterilization tunnel of an apparatus embodying my invention.

As shown, the counter A extends from one end to the other of the apparatus and has a substantially flat horizontal top wall 10 and depending front and end walls 11 and 12, respectively.

The sink B is mounted in the top wall 10 of the counter intermediate its ends and has a suitable drain 13. Preferably this sink is circular in cross section and of sufficient depth to receive the header C, carrier D, wire basket E, and glasses H. Fixed to the upright walls of the sink at substantially diametrically opposed points thereof are bars 14 that cooperate with said upright walls to support shafts 15 for rollers 16.

The header C is also circular and is centered within the sink B adjacent the bottom thereof. Extending through a wall of the sink to the header C is a conduit 17 that is adapted to receive hot and cold water respectively from branch conduits 18 and 19 provided with valves 20 and 21 under the control of a suitable hand lever 22. Projecting upwardly from the top wall 23 of the header at spaced points thereof are short tubes 24 upon which are mounted suitable nozzles 25 having inclined jets 26 for directing the water upwardly to both the inside and outside of the glasses H when disposed within the sink B.

The revoluble carrier D is preferably formed of sheet metal and is circular in configuration. Such carrier is located within the sink B in concentric relation thereto and is provided with a hinged cover 27. The carrier is open at the bottom except for an inturned flange 28 that rides on the rollers 16 and forms a seat or support for the wire basket E. Preferably the upper edges 29 of the carrier are spaced below the upper edges 30 of the sink so that water overflowing from the carrier will drain into the sink, and are engaged by a resilient sealing strip 31 on the underside of the cover when the latter is in closed position. The cover 27 has a knob or handle 32 that may be used when the cover is closed to revolve the carrier D on the rollers 16 and that is engageable with the top wall 10 of the counter when the cover is opened to support the cover in an inclined open position so that the glasses H and wire basket E therefor may be placed in a drying position on the cover 27. At the edges of the cover is a flange 33 that is continuous except at the hinge 34 where a space 35 is provided to permit water draining onto the cover from the glasses and wire basket to flow from the cover into the carrier. In this connection it will also be noted that the cover 27 extends over and conceals the control lever 22 for the valves 20 and 21 so that said lever is inaccessible when the cover is in open position. Hence, this provides a safety factor to prevent the water from being turned on while the cover is in such open position.

The wire basket E is circular in form and is open at the top and bottom thereof. Preferably it has a circular center portion 36 and an encircling series of segmental portions 37 for the reception of the glasses H. Inwardly extended horizontal lengths 38 of wire carried by the center and segmental portions 36 and 37, respectively, are used to support the glasses in said portions and may, if desired, be covered with rubber or some other sound deadening material.

The sterilization tunnel F for the glasses is transparent and contains a slideway 40 for the glasses. Beneath the slideway is an electric germicidal lamp 41 supported by a U-shaped member 42 that constitutes a reflector for the light rays from said lamp. Preferably the tunnel F is made of glass and is located at a higher elevation in rear of but adjacent the sink B, and the slideway 40 has suitable slide bars 43 and guide rails 44 and is preferably provided at opposite ends of the tunnel F with forwardly curved end portions 45 and 46 which constitute respectively convenient loading and unloading stations for the glasses.

In use, the glasses to be washed and sterilized are first placed upside down in the wire basket E. Then the basket containing the glasses is placed within the revoluble carrier D. After the cover 27 of the carrier is closed, the lever 22 may be operated so that either hot or cold water may, as desired, be admitted to the header C and nozzles 25 so that it will be projected from the latter against the glasses H. While the water is turned on, the knob or handle 32 of the cover is then used to revolve the carrier D on the rollers 16 so that the glasses H will be moved accordingly over and relative to the nozzles 25. Thus, the water will be directed to both the inside and outside of the glasses to thoroughly wash the same. If desired, the lever 22 may be operated by the left hand while the knob 32 is operated by the right hand of the operator. After the washing operation is completed, the lever 22 is returned to normal inactive position and movement as aforesaid of the carrier is stopped. The cover 27 may then be swung open until the knob 32 rests upon the top wall 10 of the counter. The basket E of washed glasses is then removed from the carrier D and placed in drying position on the cover 27. When it is desired to sterilize the glasses, they are moved from the wire basket E on the cover 27 to the loading station 45 at the left end of the slideway and are then pushed or shoved along the slideway through the tunnel F as other glasses are placed on the loading station. As the glasses H pass through the tunnel F, they are subjected to the light rays from the germicidal lamp 41 so that they are sterilized when they arrive at the unloading station 46 at the right end of the slideway.

Thus, from the foregoing, it will be apparent that I have provided a very practical and efficient apparatus for the purposes set forth. Such apparatus is a compact self-contained unit that is comparatively inexpensive to manufacture and neat and attractive in appearance. In this connection it will be noted that the water conduits or piping 17, 18, 19, valves 20 and 21, header C and associated parts are all within and concealed by the counter A. The apparatus disclosed herein is also simple to operate and insures proper washing and sterilization of the glasses.

What I claim as my invention is:

1. An apparatus of the class described having an open ended tunnel of inverted channel shape made of transparent material, an open slideway for articles to be sterilized extending through said tunnel and provided beyond opposite ends thereof with terminal portions constituting respectively loading and unloading stations for the articles aforesaid, a germicidal lamp beneath the slideway, and a support for said lamp having means for reflecting light rays from said lamp through the open slideway toward the articles within said tunnel.

2. An apparatus of the class described having an open ended tunnel, an open slideway for articles to be sterilized extending through said tunnel and provided beyond opposite ends thereof with forwardly curved terminal portions constituting respectively loading and unloading stations for the articles aforesaid, a germicidal lamp beneath the slideway, and means beneath said lamp for reflecting light rays upwardly from said lamp through the open slideway toward the articles within said tunnel.

3. An apparatus of the class described having an open ended tunnel, an open slideway for articles to be sterilized extending through said tunnel and provided beyond opposite ends thereof with terminal portions constituting respectively loading and unloading stations for the articles aforesaid, a germicidal lamp beneath the open slideway and a support for said lamp having means beneath said lamp for reflecting light rays upwardly from said lamp through the open slideway toward the articles within said tunnel.

4. An apparatus of the class described having an open ended tunnel of inverted channel shape made of transparent material, an open slideway for articles to be sterilized extending through said tunnel and provided beyond opposite ends thereof with terminal portions constituting respectively loading and unloading stations for the articles aforesaid, and a germicidal lamp supported beneath the open slideway for casting light rays through the open slideway toward the articles within said tunnel.

5. An apparatus of the class described having an open ended tunnel, an open slideway for articles to be sterilized extending through said tunnel and having beyond opposite ends thereof end portions constituting respectively loading and unloading stations for the articles aforesaid, and a germicidal lamp supported beneath the open slideway for casting light rays through the open slideway toward the articles within said tunnel.

6. An apparatus of the class described having a substantially straight open ended tunnel of inverted channel shape, an open slideway for articles to be sterilized extending through said tunnel and provided openly beyond opposite ends thereof with curved end portions constituting respectively loading and unloading stations for the articles aforesaid, a germicidal lamp beneath the open slideway, and means beneath said lamp for reflecting light rays upwardly from said lamp through the open slideway toward the articles within said tunnel.

7. An apparatus of the class described having an open ended tunnel of inverted channel shape, an open slideway for articles to be sterilized extending through said tunnel and provided openly beyond opposite ends thereof with end portions constituting respectively loading and unloading stations for the articles aforesaid, a germicidal lamp beneath the open slideway, and means beneath said lamp for reflecting light rays upwardly from said lamp through the open slideway toward the articles within said tunnel.

8. An apparatus of the class described having a substantially straight open ended tunnel, an open slideway for articles to be sterilized extending through said tunnel and provided openly beyond opposite ends thereof with curved end portions constituting respectively loading and unloading stations for the articles aforesaid, and a germicidal lamp supported beneath the open slideway for casting light rays through the open slideway toward the articles within said tunnel.

9. An apparatus of the class described having an open ended tunnel of inverted channel shape, a stationary open slideway for articles to be sterilized extending through said tunnel and provided openly beyond opposite ends of the tunnel with end portions constituting loading and unloading stations for the articles, and a germicidal lamp supported beneath the tunnel intermediate the end portions of the open slideway for casting light rays through the open slideway toward the articles within said tunnel.

10. An apparatus of the class described having an open ended tunnel of inverted channel shape, an open slideway for articles to be sterilized extending through said tunnel and provided beyond opposite ends thereof with curved end portions constituting respectively loading and unloading stations for the articles aforesaid, a germicidal lamp beneath the open slideway, and means beneath said lamp for reflecting light rays upwardly from said lamp through the open slideway toward the articles within said tunnel.

11. An apparatus of the class described having an open ended tunnel of inverted channel shape, an open slideway for articles to be sterilized extending through and provided endwise beyond opposite open ends of the tunnel with terminal portions constituting loading and unloading stations for the articles, a germicidal lamp beneath the open slideway intermediate the open ends of the tunnel, and a support for said lamp having means for reflecting rays from said lamp through the open slideway to articles thereon within the tunnel.

12. An apparatus of the class described having an open ended tunnel of inverted channel shape, an open slideway for articles to be sterilized extending through said tunnel from one open end to the other thereof and provided outside the tunnel beyond said open ends with terminal portions constituting respectively loading and unloading stations for the articles aforesaid, and a germicidal lamp supported beneath said open slideway intermediate the open ends of the tunnel for casting light rays upwardly through the open slideway to articles thereon within said tunnel.

13. An apparatus of the class described having an open ended tunnel, a length of track for articles to be sterilized extending through the tunnel and provided outside the tunnel beyond opposite open ends thereof with terminal portions constituting loading and unloading stations for the articles, the portion of the track within the tunnel being open, and a germicidal lamp beneath the open portion of the track within the tunnel for casting light rays upwardly through said open portion toward articles thereon to sterilize the same.

14. An apparatus of the class described having an open ended tunnel of inverted channel shape, and a slideway for articles to be sterilized extending through the tunnel and provided outside the tunnel beyond opposite open ends thereof with terminal portions constituting loading and unloading stations respectively for the articles, the tunnel being transparent so that articles on the slideway within the tunnel are visible, the portion of the slideway within the tunnel being open, and a germicidal lamp beneath the open portion of the slideway within the tunnel for casting light rays upwardly through said open portion to articles thereon to sterilize the same.

WILLIAM E. DOUGHTY.